June 21, 1966     F. G. KONSTANDT     3,256,617

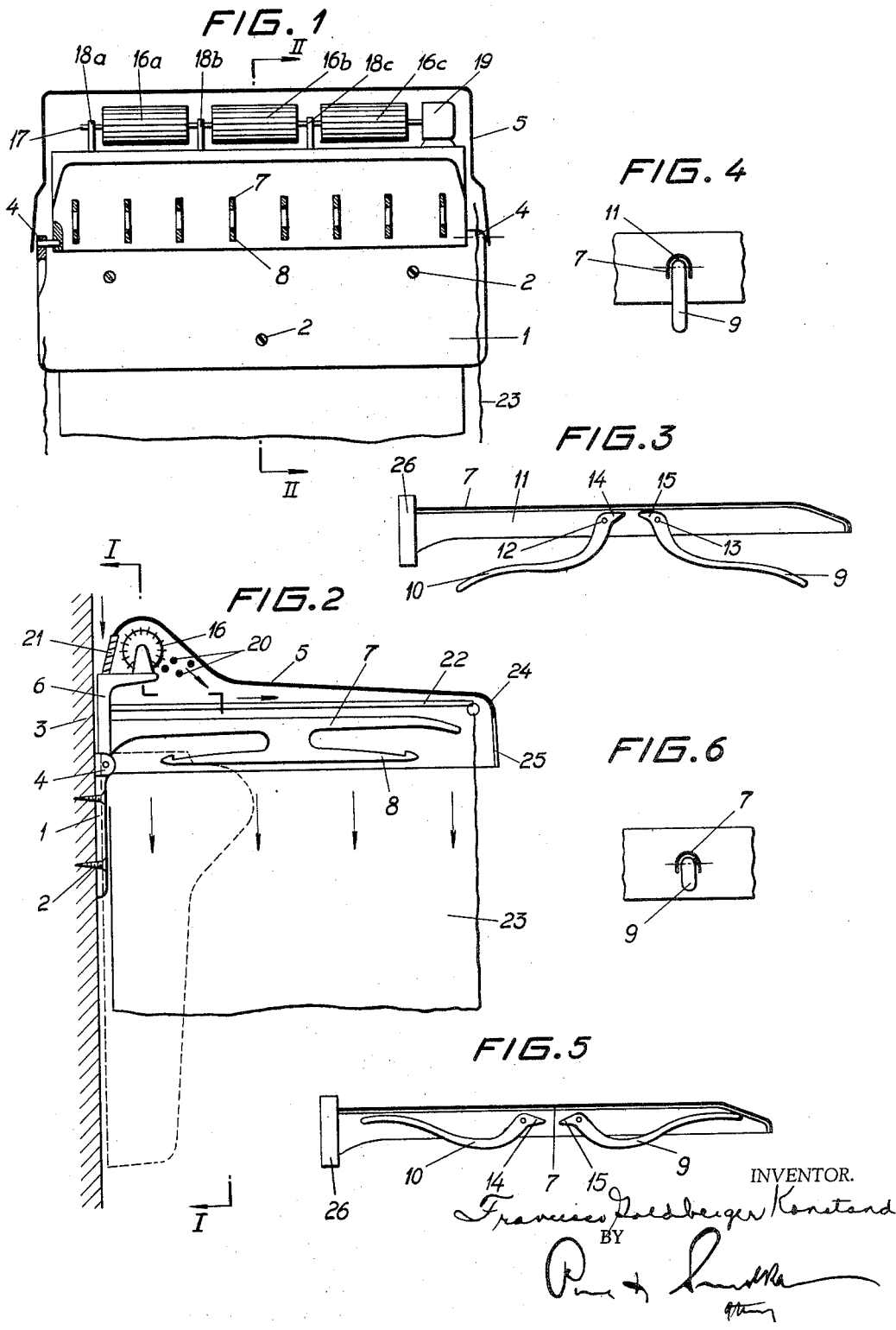

APPARATUS FOR DRYING LAUNDRY AND THE LIKE

Filed Oct. 1, 1963     8 Sheets-Sheet 2

INVENTOR:
FRANCISCO GOLDBERGER KONSTANDT

BY

Michael J. Striker
ATTORNEY

INVENTOR:
FRANCISCO GOLDBERGER KONSTANDT

BY

Michael J. Striker
ATTORNEY

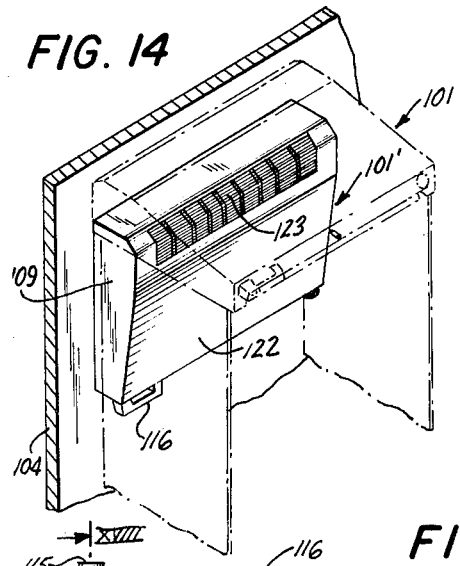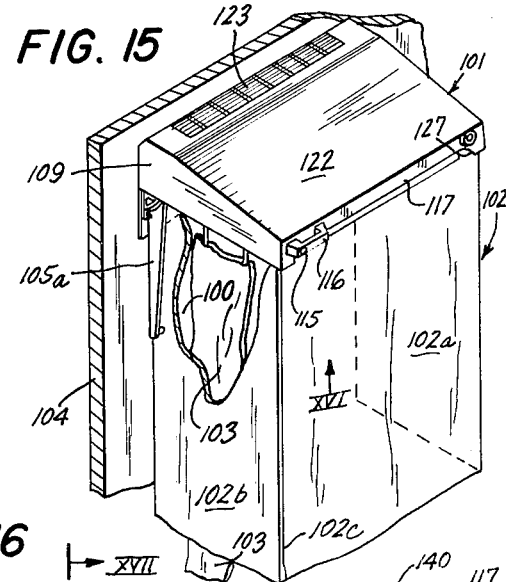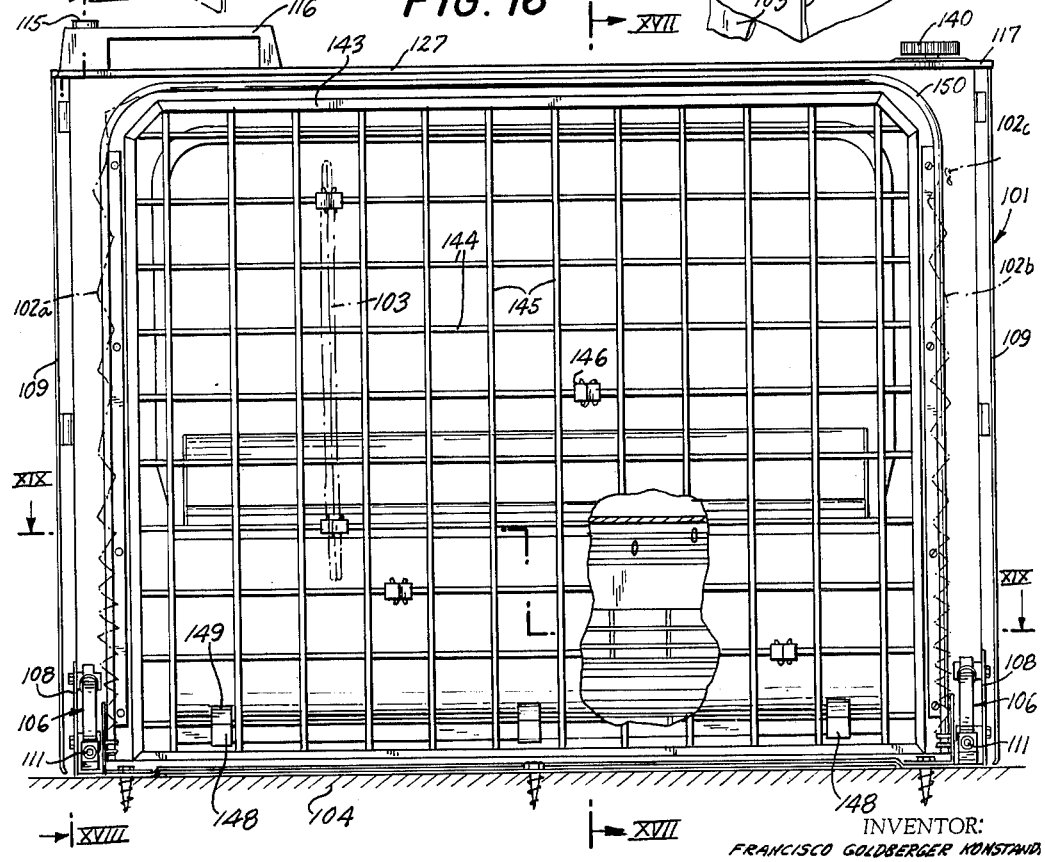

June 21, 1966  F. G. KONSTANDT  3,256,617
APPARATUS FOR DRYING LAUNDRY AND THE LIKE
Filed Oct. 1, 1963  8 Sheets-Sheet 5

INVENTOR:
FRANCISCO GOLDBERGER KONSTANT
BY
Michael J. Striker
ATTORNEY

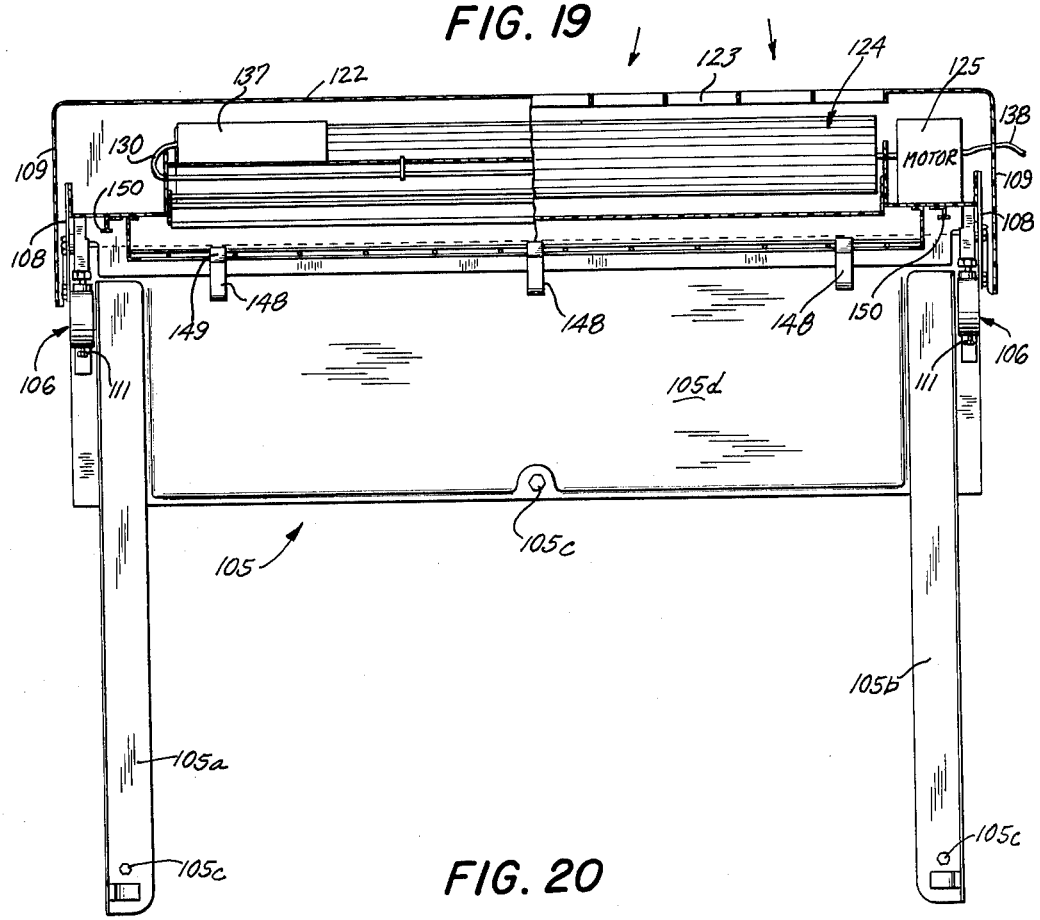
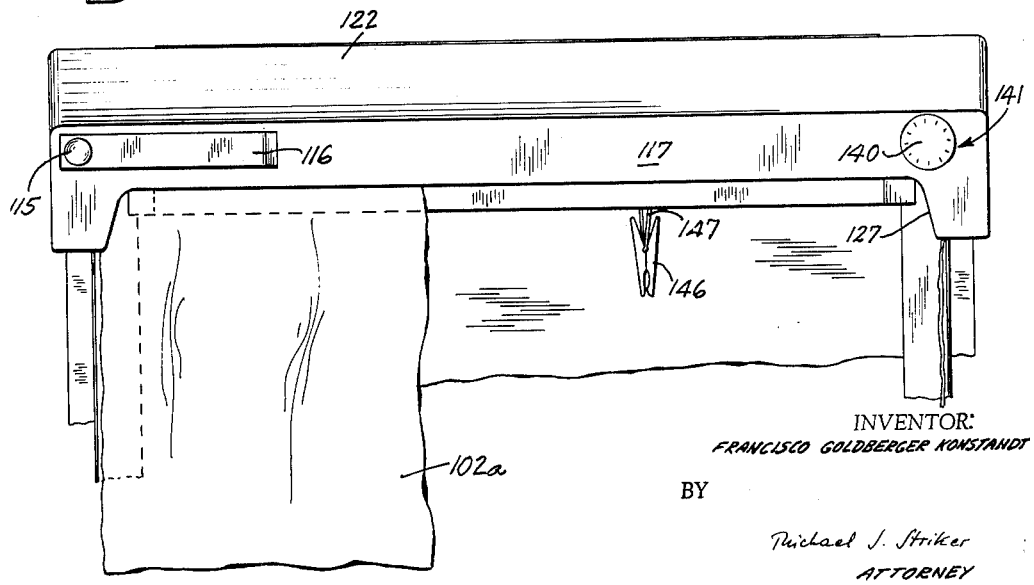

June 21, 1966   F. G. KONSTANDT   3,256,617
APPARATUS FOR DRYING LAUNDRY AND THE LIKE
Filed Oct. 1, 1963   8 Sheets-Sheet 7
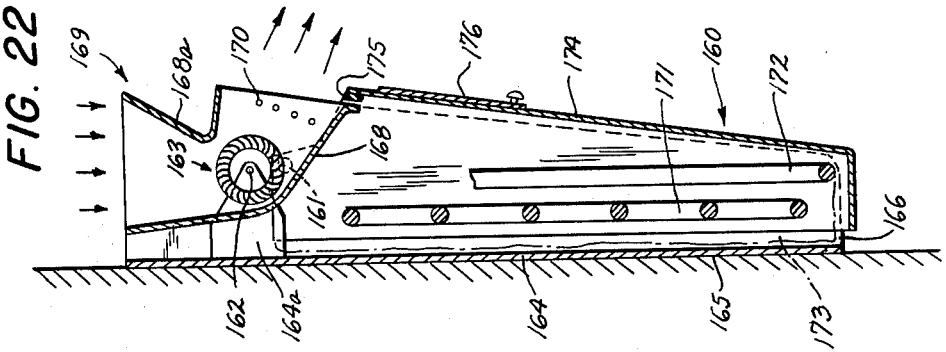
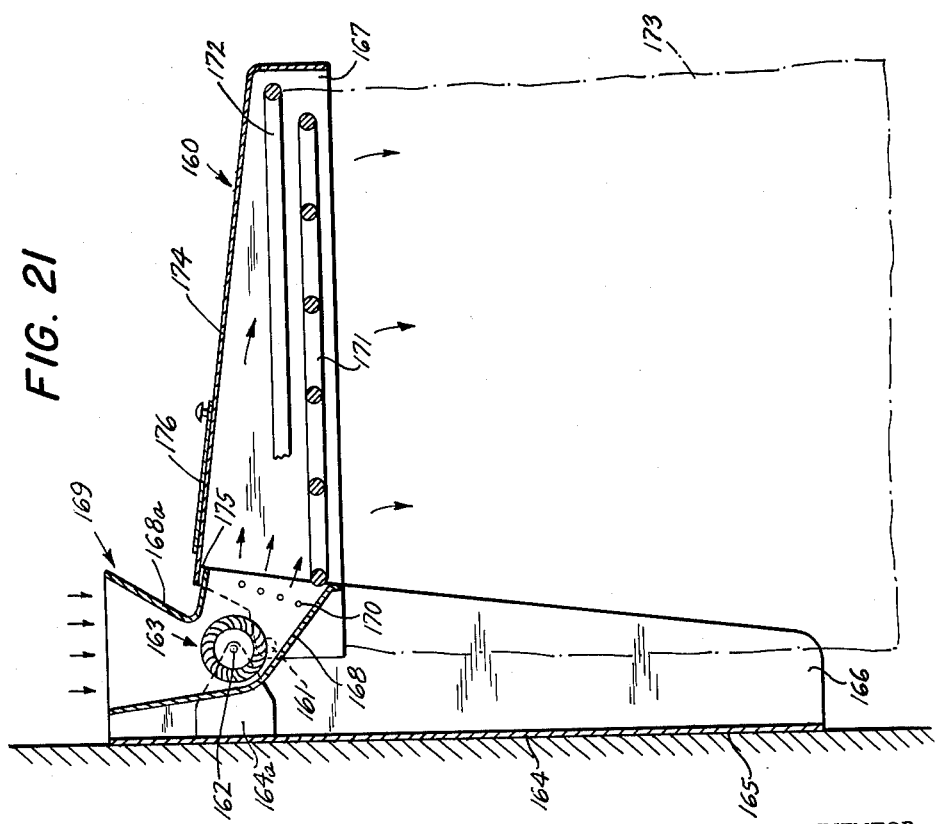
INVENTOR.
FRANCISCO GOLDBERGER KONSTANDT
BY
Michael J. Striker
ATTORNEY June 21, 1966   F. G. KONSTANDT   3,256,617
APPARATUS FOR DRYING LAUNDRY AND THE LIKE
Filed Oct. 1, 1963   8 Sheets-Sheet 8
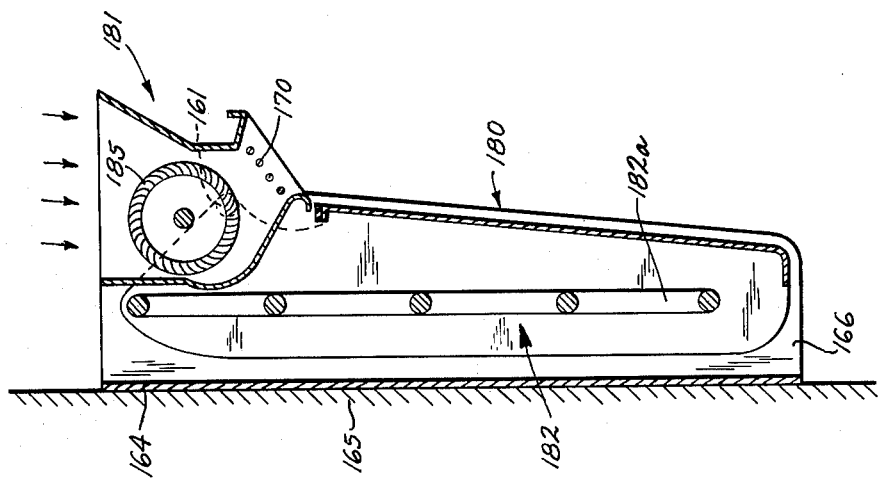
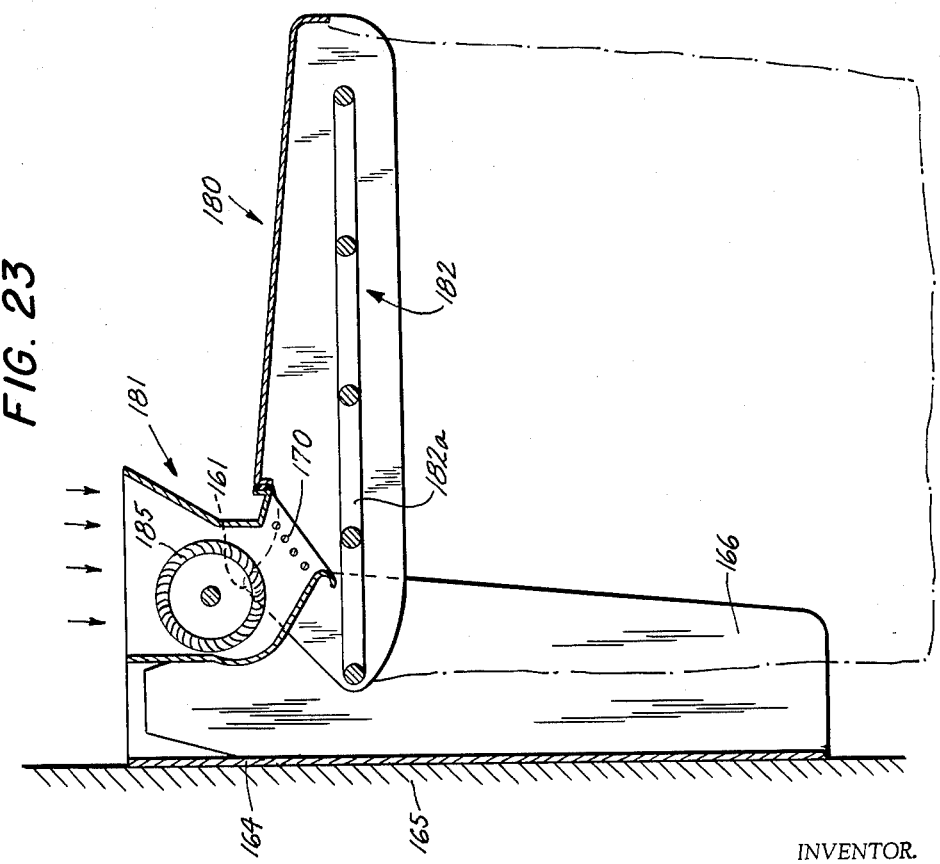
INVENTOR.
FRANCISCO GOLDBERGER KONSTANDT
BY
Michael J. Striker
ATTORNEY

United States Patent Office 3,256,617
Patented June 21, 1966

3,256,617
APPARATUS FOR DRYING LAUNDRY AND THE LIKE
Francisco Goldberger Konstandt, Neustadtstrasse 7, Lucerne, Switzerland
Filed Oct. 1, 1963, Ser. No. 314,087
31 Claims. (Cl. 34—162)

This is a continuation-in-part of my applications Serial Nos. 68,459 and 152,834, now abandoned.

The present invention relates to an apparatus for drying laundry and the like, and more particularly to a multipurpose collapsible drier which, in addition to drying clothes, underwear and similar articles, is equally suited for use as a hair drier, room heater and/or room ventilator.

It is an important object of my invention to provide a very compact, low-cost, eye-pleasing and highly versatile drier which may be used for drying with hot air or with cold air and which may be readily installed in a bathroom, laundry room or another area of a house without occupying too much space and without consuming too much electrical energy.

Another object of my invention is to provide a drier which is constructed and assembled in such a way that it may be readily collapsed when not in use as a laundry drier so as to occupy very little room but still to function properly as a room heater or room ventilator.

A further object of the invention is to provide a laundry drier or the above outlined characteristics which is easy to manipulate, which will automatically disconnect its current-driven or current-operated elements from a source of electrical energy to save electricity without requiring any superivsion by the housewife, which may be rapidly converted from drying with hot air to drying with cold air or vice versa, which may be transported to different areas of a home so that it may heat or aerate a selected room other than the room where it is put to use as a laundry drier, and which may accommodate substantial quantities of laundry without affecting its drying operation.

An additional object of the invention is to provide a laundry drier which will expel moisture without any damage to or wear upon the articles to be dried so that it may be used for rapid drying of highly delicate ladies' underwear, stockings and similar articles which cannot be dried in any such conventional rotary driers of which I have knowledge at this time.

A further object of the invention is to provide a novel article suspending device which may be used in a drier of the above outlined characteristics and which is constructed in such a way that it will produce gentle movements of the articles of laundry without causing any damage to such articles.

An additional object of the invention is to provide a laundry drier which may be manipulated by weak persons and by persons having little or no technical skill.

With the above objects in view, one feature of my invention resides in the provision of a drier for articles of laundry and the like which comprises fixed main supporting means secured to a masonry wall or the like, a carrier having a top wall and spaced side walls which define between themselves a chamber with an open side located opposite the top wall, pivot means connecting the carrier to the main supporting means so that the carrier is pivotable downwardly and upwardly about a horizontal axis to respectively assume a first position in which the open side of the chamber is located in a substantially vertical plane and an operative position in which the open side of the chamber faces downwardly, a blower which is accommodated in the chamber and which may assume the form of a tangential blower including an elongated drum having an axis of rotation adjacent to the pivot axis of the carrier to produce a stream of air which flows into and thereupon from the chamber, and a suspending device mounted in the carrier and arranged to support articles of laundry in the stream of air in suspended condition when the carrier assumes its operative position. The suspending device is preferably mounted across the open end of the chamber so that the articles of laundry extend downwardly from the open end and are dried by air which is being compelled to escape from the chamber when the blower is in operation and the carrier is moved to its operative position.

The novel features which are considered as characteristic of the invention are set forth in particular in the appended claims. The improved drier itself, however, both as to its construction and its method of operation, together with additional features and advantages thereof, will be best understood from the following detailed description of certain specific embodiments with reference to the accompanying drawings, in which:

FIG. 1 is a transverse vertical section through a drier which embodies one form of my invention, the section being taken in the direction of arrows as seen from the line I—I of FIG. 2;

FIG. 2 is a longitudinal vertical section through the drier as seen in the direction of arrows from the line II—II of FIG. 1;

FIG. 3 is a side elevational view of a modified suspending device whose hanger is shown in exposed position and which may be used in the drier of FIGS. 1 and 2;

FIG. 4 is an end view of the hanger which is used in the suspending device of FIG. 3;

FIG. 5 shows the hanger of the suspending device in concealed position;

FIG. 6 is an end view of the hanger as seen from the right-hand side of FIG. 5;

FIG. 14 is a perspective view of an additional drier whose carrier is provided with means for disconnecting a series of heat exchanger pipes from the source of electrical energy, the operative position of the carrier being indicated by phantom lines;

FIG. 15 is a similar perspective view of the drier with the carrier shown in operative position and with the curtain closed by a slide fastener;

FIG. 16 is a greatly enlarged bottom plan view of the carrier as seen in the direction of arrow XVI in FIG. 15;

FIG. 19 is a transverse vertical section as seen in the direction of arrows from the line XIX—XIX of FIG. 16, showing the main supporting member for the carrier of the drier shown in FIGS. 14 and 15;

FIG. 20 is a front elevational view of the carrier as seen from the right-hand side of FIG. 17 or 18;

FIG. 21 is a vertical section through another drier whose carrier is shown in horizontal position;

FIG. 22 is a similar vertical section but showing the carrier in vertical position;

FIG. 23 is a vertical section through an additional drier whose carrier is shown in horizontal position; and FIG. 24 is a similar vertical section but showing the carrier in vertical position.

Figure 7:
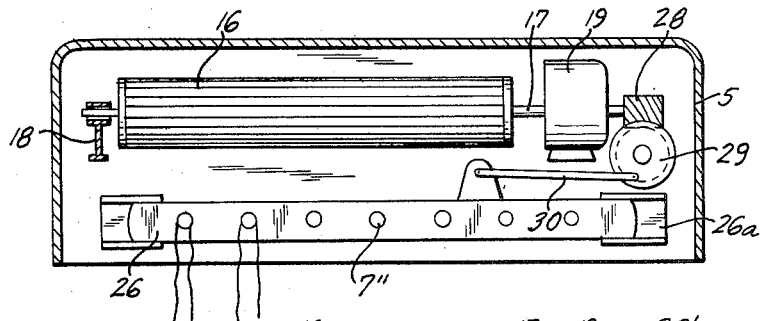
FIG. 7 is a transverse vertical section through a modified drier which comprises a one-piece blower and a movable suspending device.

Referring to the drawings, and first to FIGS. 1 and 2, there is shown a drier for articles of laundry or the like which comprises fixed main supporting means in the form of a vertical plate 1 rigidly secured to the exposed side of a masonry wall 3, for example, in the bathroom or laundry room of a house, apartment, barracks or other type of living quarters. In the illustrated embodiment, the means for fastening the plate 1 to the wall 3 comprises a series of screws 2 but it will be readily understood that such fastening means may assume the form of nails, expansion bolts or the like, and it is equally possible to provide fasteners which permit rapid detachment and reconnection of the plate 1. The plate 1 may be fixed at such elevation that its brackets 4 are located about six feet above the floor level. The brackets 4 extend forwardly from the vertical side faces of the plate 1 and are provided with aligned horizontal openings for the pivots of a carrier 5. This carrier resembles an inverted pan and includes a rear wall 6 which is substantially aligned with and which extends upwardly from the plate 1 when the drier assumes the operative position of FIG. 2, i.e., the pivots which connect the carrier 5 with the plate 1 are located at the lower end of the rear wall 6 and the brackets 4 are adjacent to the upper end of the plate 1. The rear wall 6 supports a suspending device including a series of forwardly extending bars 7 whose longitudinal extensions are substantially parallel to the side walls of the carrier 5 and perpendicular to the plane of the rear wall. Each bar 7 supports at its underside a two-armed hanger 8 which is integral therewith. These hangers extend across the open side of the chamber defined by the walls of the carrier 5 and serve to support in suspended condition blouses, shirts, jackets, skirts and similar articles of clothing. Any suitable form of hangers may be adopted, and the hangers 8 may consist of wood, metal or synthetic plastic. The hangers are disposed in parallel vertical planes and at such distance from each other that the articles suspended thereon need not come into actual contact with each other. The number of hangers will depend on the width of the drier and on its intended use, i.e., whether for commercial or domestic purposes. In the embodiment of FIGS. 1 and 2, the suspending device comprises eight hangers 8 but the number of hangers may be less or greater.

The drier further comprises a tangential blower which is adjacent to the rear wall 6 (and hence to the pins which connect the brackets 4 with the wall 6) and whose horizontal axis is parallel with the pivot axis of the carrier 5. This blower comprises a series of coaxial sections or drums 16a, 16b, 16c mounted on a common shaft 17 journalled in bearings 18a, 18b, 18c provided on a forwardly extending upper end portion of the wall 6. The combined axial length of the sections 16a–16c is not substantially less than the width of the carrier 5. The shaft 17 is driven by an electric motor 19 which is also mounted on the wall 6 and which is adjacent to one side of the carrier 5. The motor 19 may be located in the center between the sections 16a, 16c. The section 16b is then omitted and the motor drives two shafts, one for each of the sections 16a, 16c.

A series of horizontal heat exchanger pipes 20 extend in front of the drums 16a–16c to come in contact with air which is drawn through one or more louvered openings 21 provided in a hood forming part of the top wall of the carrier 5. Each of the pipes 20 accommodates a resistance wire or a similar heating element which is connected to a source of electric current, such as an outlet (not shown) in the wall structure 3. After exchanging heat with the pipes 20, the air stream will flow downwardly in directions indicated by the arrows (see FIG. 2). It will be noted that the louvers provided in the opening 21 prevent entry of water into the interior of the carrier 5.

A two-piece curtain 23 is suspended on and is slidable along a horizontal U-shaped rail 22 whose legs extend forwardly from the rear wall 6 and whose median portion is adjacent to the inner side of the front wall 24 of the carrier 5. The curtain consists of flexible textile or synthetic plastic sheet material and is sufficiently thin to be collapsible into small packages which may be concealed along the side and front walls of the carrier 5 when the drier is not in use. If desired, the front section of the rail 22 may be omitted so that the curtain comprises two spaced panels which extend downwardly from the sides of the carrier when the latter assumes the operative position of FIG. 2. It is also possible to lay the folded panels over the hangers 8 whereby the curtain is fully concealed in the internal chamber of the carrier when the drier is not in use.

The front wall 24 of the carrier 5 is formed with an opening 25 in the form of a horizontally extending cutout which provides an outlet for hot air when the carrier is pivoted through about 90 degrees to its broken-line inoperative position of FIG. 2 and serves as a room heater or as a ventilator, depending upon whether or not the heat exchanger pipes 20 are connected with a source of electric current. If the side walls of the carrier actually abut against the wall 3, the opening 25 constitutes the sole passage for escape of air which is being drawn through the louvered opening 21 when the motor 19 is in operation. The opening 21 is then located at the upper end of the drier to draw air in downward direction. The blower drums 16a–16c and the hood-like rear end portion of the top wall of the carrier 5 will deflect the air stream downwardly when the carrier is moved to its operative position and when the carrier is retained in such position by suitable locking devices which will be described later in connection with another embodiment of the drier. There is no need to lock the carrier 5 in the broken-line position of FIG. 2 because the carrier will automatically tend to assume such position in response to gravity.

FIGS. 3 to 6 illustrates a modified suspending device which may be used as a substitute for the suspending device 7–8 of FIGS. 1 and 2. This modified suspending device comprises an elongated bar 7' of U-shaped cross section so that it defines a downwardly opening channel 11 which faces away from the top wall of the carrier and which may accommodate two articulately mounted hanger sections 9, 10. These hanger sections are respectively mounted on horizontal pins 13, 12 which are parallel with the shaft 17 (not shown in FIGS. 3–6) and which are adjacent to nose-like projections or stops 15, 14 of the hanger sections 9, 10. The projections 14, 15 abut against the underside of the bar 7' when the sections 9, 10 are pivoted to the exposed or operative positions of FIGS. 3 and 4. On the other hand, each hanger section may be pivoted to the concealed position of FIGS. 5 and 6 in which its free end abuts against the underside of the bar 7' whereby the sections are nearly completely concealed in the channel 11. An important advantage of the structure shown in FIGS. 3 to 6 is that the suspending device occupies little space and that the depth of the carrier 5 may be reduced accordingly. This is of particular importance when the drier of my invention is used in a small bathroom where the space is at a premium. The rear end of the bar 7' is secured to an elongated holder 26 which may be fixed to the rear wall 6 of the carrier 5 shown in FIGS. 1 and 2. It will be noted that the sections 9, 10 of FIGS. 3 and 5 together constitute a composite hanger which resembles one of the hangers 8 when the projections 14, 15 are pivoted into abutment with the channeled bar 7'. In other words, each hanger 8 of FIGS. 1 and 2 may be replaced by a composite hanger which can be at least partially concealed in the interior of a channel-shaped bar.

If desired, the rear wall 6 or the plate 1 may carry a sheet of plastic material or the like to make sure that articles of laundry suspended on the hangers 8 cannot come into contact with the wall 3.

An important advantage of the tangential blower which comprises one or more drums is that such blower occupies little room so that the carrier 5 may be a shallow pan-like structure. Furthermore, and since the blower is comparatively long, its drums will direct air to all or nearly all zones of the drying chamber defined by the curtain 23 so that all articles of laundry will be dried at the same rate of speed. If desired, the carrier 5 may accommodate suitable baffles which are located downstream of the pipes 20 and which serve to divide the stream of hot air into a series of smaller streamlets as well as to direct such streamlets to selected zones of the drying chamber which accommodates the articles to be dried. The baffles may be reciprocated by the motor 19 or by a separate motor to further enhance the drying effect.

As explained hereinabove, the drier of my invention may be used as a hot-air drier, as a cold-air drier, as a room ventilator and/or as a room heater. For example, when the articles of laundry are to be dried overnight, the heat exchanger pipes 20 may be disconnected from the source of electric current so that the articles of laundry are being dried solely by air at room temperature which circuates in response to rotation of the blower drums 16a–16c. When the drier is used as a room heater, the carrier is pivoted to the broken-line position of FIG. 2 to direct a current of hot air downwardly and through the opening 25 but, of course, the carrier may remain in the full-line position of FIG. 2 so as to direct smaller streamlets of heated air in the same way as when the hangers 8 support articles of laundry. Finally, and when the drier serves as a room ventilator, the pipes 20 are not heated and the blower merely circulates air in the room in which the drier is mounted. If the drier is detachable from the wall 3, it may be readily transported to a room other than a bathroom or laundry room in order to heat a bedroom or a living room, as the case may be. Since the carrier 5 and the suspending devices preferably consist of comparatively thin sheet material (metal, plastic, wood or a combination of such materials), the overall weight of the drier is not excessive so that a housewife can readily transport it to different sections of a home.

FIG. 7 illustrates a modified drier wherein the holder 26 is reciprocable by the blower motor 19. The shaft 17 extends from both sides of the motor 19 so that it drives a one-piece tangential blower drum 16 and a worm 28 which meshes with a worm wheel 29 provided with an eccentric pin which is coupled to one end of a motion transmitting rod 30. The other end of this rod is articulately connected with a lug provided on the holder 26 which is guided in tubular ways 26a. Thus, when the worm wheel 29 rotates, the holder 26 and the rod-like hangers 7" mounted thereon will reciprocate between the side walls of the carrier 5. The extent of such reciprocatory movement is determined by the throw of the eccentric pin on the worm wheel 29. It will be noted that the axial length of the blower drum 16 is not substantially less than the width of the carrier 5. The shaft 17 is rotatable in a single bearing 18.

Figure 8:
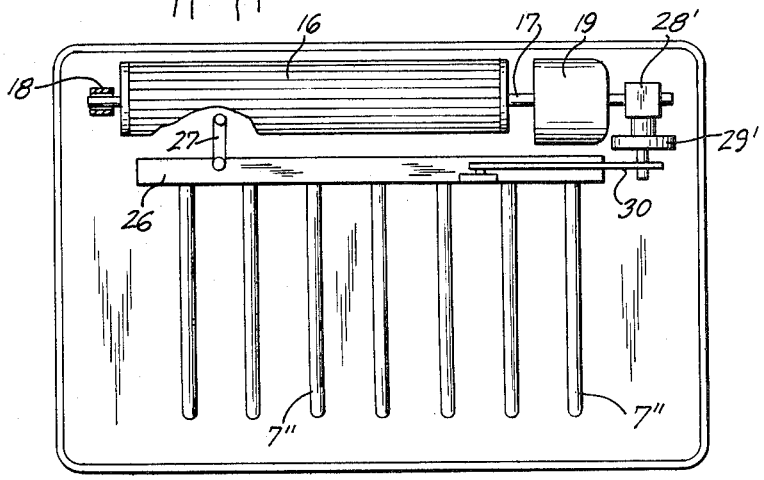
FIG. 8 is a bottom plan view of a drier which is similar to the drier of FIG. 7.

In FIG. 8, the tubular ways 26a are replaced by a link 27 which provides an articulate connection between the carrier and the holder 26. The construction of the drive connecting the holder 26 with the motor 19 is somewhat different because the worm 28 is replaced by a transmission 28' whose output shaft drives a disk 29' which replaces the worm wheel 29. It goes without saying that the link 27 of FIG. 8 may be replaced by tubular ways and that the drier of FIG. 7 may utilize a transmission and a disk of the type shown in FIG. 8. In FIGS. 7 and 8, the hangers assume the form of parallel rods 7" which are horizontal when the drier is in actual use. The holder 26 with its hangers 7" resembles a drying rack such as is often used in bathrooms for drying of diapers or the like. The holder 26 may be reciprocated by a separate motor.

An important advantage of the driers shown in FIGS. 7 and 8 is that the articles of laundry are caused to flutter in the drying air stream to enhance the drying effect and to insure that all portions of suspended articles will come into repeated contact with air. The holder need not reciprocate in a horizontal plane since a reciprocatory or swinging or oscillating motion in a vertical plane, in an elliptical path or in a circular path will be equally satisfactory. Horizontal movements are often preferred because a long article of laundry which is suspended on one or more hangers might come into contact with the floor surface if the holder reciprocates in a vertical direction or if the movement performed by the holder has a vertical component. Of course, the motion imparted to the holder should be rather slow to make sure that the articles will remain on the respective hangers. It was found that the operation of the reciprocating or moving means for the holder should preferably be such that the articles of clothing will perform a wave-like movement.

Figure 9:
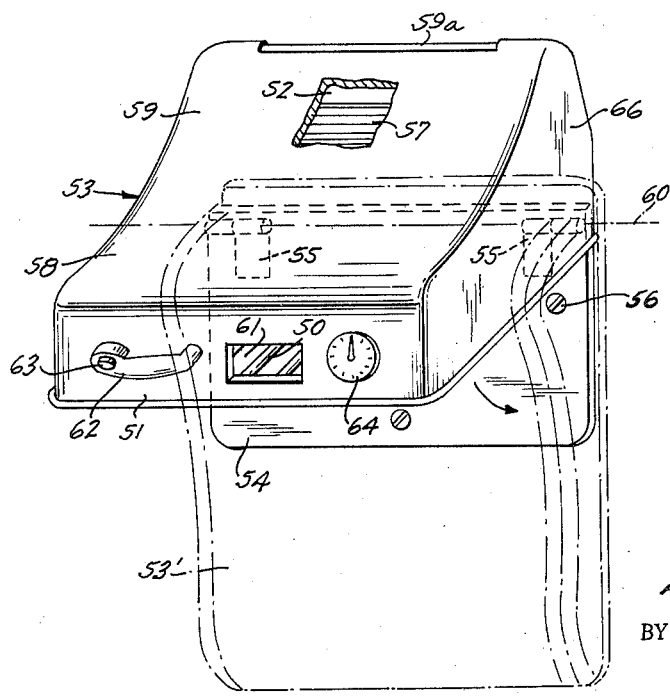
FIG. 9 is a perspective view of a drier wherein the suspending device comprises a series of parallel hanger bars which may support conventional clothes pins, a portion of the carrier being broken away and the heating means being omitted for the sake of clarity.

FIG. 9 illustrates a drier wherein the suspending device comprises a series of parallel coplanar hanger bars 50 which extend in a horizontal plane between the front and rear walls 51, 52 of an inverted pan-shaped carrier 53. The rear wall 52 is connected to a main supporting plate 54 by means of hinges 55 so that the carrier 53 may pivot between the full-line operative position of FIG. 9 and an inoperative position 53' which is shown in broken lines and in which the open side of the chamber defined by the walls of the carrier is adjacent to a supporting wall. The plate 54 is secured to such supporting wall by screws 56. A tangential blower 57 which preferably assumes the form of an elongated drum is adjacent to the rear wall 52 to draw air through an opening 59a provided in a hood-shaped rear portion 59 of the top wall 58. The axial length of this blower is not substantially less than the distance between the side walls 66 of the carrier. The front wall 51 of the carrier 53 has an opening 61 through which the air stream may escape when the carrier is pivoted to its broken-line position 53'. A handle 62 is fixed to the outer side of the front wall 51 and is provided with a spring-biased knob 63 which releases a locking mechanism serving to normally hold the carrier in the operative position of FIG. 9. Thus, the operator grasps the handle 62 with one hand and depresses the knob 63 with one finger of the same hand to release the carrier and to thereupon pivot the carrier about the common horizontal axis 60 of the hinges 55. A switch controlled by a clockwork mechanism 64 which is mounted on the front wall 51 serves to shut off the flow of electric current to the blower 57 after a period of time which is selected by the operator. The mechanism 64 is of conventional design and by itself forms no part of my invention.

One or more heat exchanger pipes (not shown) are located downstream of the blower 57 to heat the stream of air which is drawn through the opening 59a and which flows toward the bars 50. Each of these bars may support one or more conventional clothes pins or similar retaining devices.

The axis of the blower 57 is closely adjacent to the common axis 60 of the hinges 55 so that the mass of the carrier and of the parts suspended thereon is adjacent to the hinges which means that little effort will be necessary to pivot the carrier between its end positions.

If desired, the bars 50 may extend between and have their ends secured to the side walls 66 of the carrier 53.

An important advantage of the drier shown in FIG. 9 is that it may be mass-produced at very low cost because the suspending device merely includes a series of metallic, wooden or plastic bars 50 and a requisite number of conventional clothes pins which may be suspended on the bars by means of eyes, hooks and similar detachable coupling devices. Bed sheets, pillow cases, tablecloths and other bulky pieces of laundry may be suspended by two or more clothes pins so as to be located in the stream of heated air which flows downwardly and between the bars 50 when the drier of FIG. 9 is in actual use. The opening 61 will direct the stream of air downwardly when the carrier assumes the position 53' and when the drier is used as a fan or room heater.

The bars 50 may be used without clothes pins, i.e., an article of laundry may be folded directly over one or more such bars so that the bars by themselves serve to support the articles to be dried. For example, several handkerchiefs, socks, stockings and similar small articles of laundry may be carried by each of the bars 50 so that the clothes pins may be dispensed with.

Figure 10:
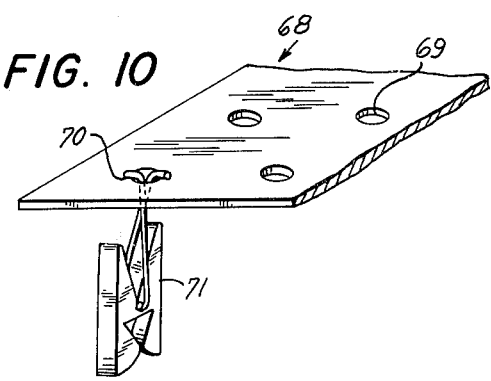
FIG. 10 is a fragmentary perspective view of a different suspending device which comprises a perforated plate.

FIG. 10 illustrates a modified suspending device which comprises a perforated plate 68 made of sheet metal or the like and which may replace the bars 50 of FIG. 9 or the suspending devices of FIGS. 1 to 8. Each perforation 69 may receive a connector in the form of a hook or eye 70 for a clothes pin 71.

Figure 11:
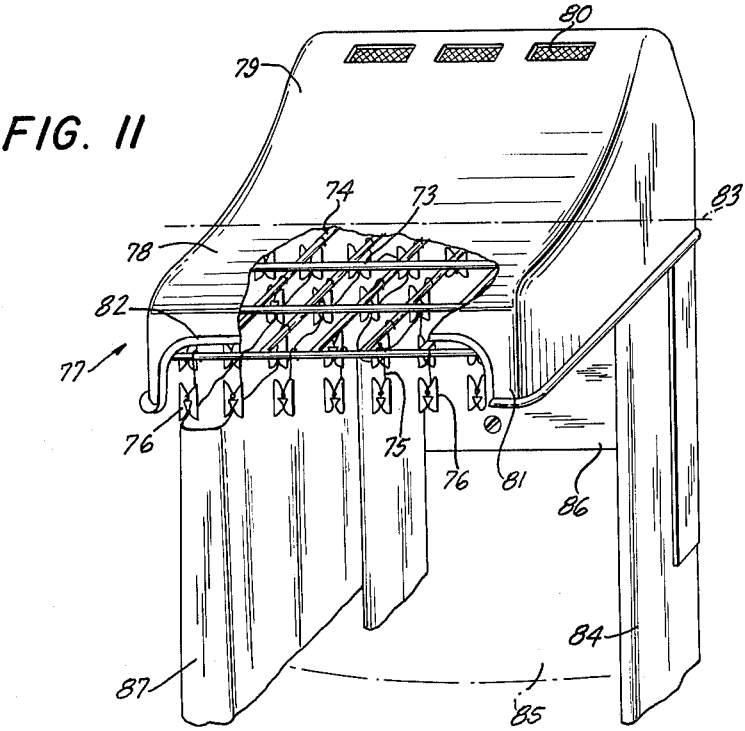
FIG. 11 is a perspective view of a drier wherein the suspending device comprises a network of intersecting bars for clothes pins and wherein the curtain comprises a rear panel which prevents direct contact of suspended articles with the main supporting structure for the drier.

FIG. 11 illustrates a drier wherein the suspending device comprises a network of intersecting bars 73, 74 which are disposed at right angles with reference to each other and which support a series of connectors 75 for clothes pins 76. The carrier 77 comprises a top wall 78 having a hood-shaped rear portion 79 with three louvered openings 80. The front wall 81 is formed with a cutout 82 through which the stream of air escapes from the chamber of the carrier 77 when the latter is pivoted to its inoperative position and serves as a room ventilator or room heater. The blower (not shown) is adjacent to the horizontal pivot axis 83 of the carrier 77, and this carrier supports a slidable curtain 84 including a flexible rear panel 85 (shown in phantom lines) which conceals the fixed supporting plate 86 so that the article 87 of laundry cannot be contaminated by direct contact with the plate 86 or with the wall on which the plate 86 is mounted. The article 87 is a bed sheet which is suspended in such a way that it forms a body of zig-zag shape whereby each of its panels is exposed to and is dried by the stream of heated air flowing downwardly through the drying chamber defined by the carrier 77 and curtain 84.

The clothes pins 76 may be suspended directly on the bars 73, 74. The network of bars 73, 74 is detachable from the carrier so that it may be replaced by the perforated plate 68 of FIG. 10 or by the system of bars 50 shown in FIG. 9.

The blower (not shown in FIG. 11) is accommodated in the hood 79. The means for releasing the carrier so that it may be pivoted downwardly to its inoperative position is not shown in FIG. 11; such releasing means may assume the form of a handle and a knob similar to the parts 62, 63 shown in FIG. 9. The heater device comprises one or more heat exchanger pipes (not shown) which are located in the path of the air stream flowing from the blower toward the article 87.

Figure 12:
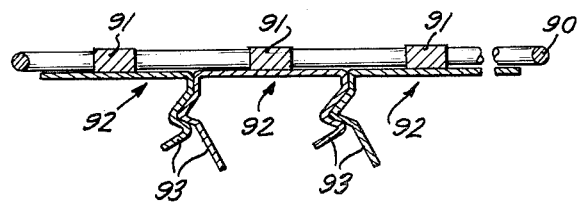
FIG. 12 is a vertical section through a suspending device which comprises cooperating pairs of elastic clamping elements.

FIG. 12 illustrates a further suspending device which includes a frame 90 consisting for example of round stock, a series of horizontal bars 91 whose ends are welded or otherwise fixed to the frame 90, and cooperating clamping elements 92 which are secured to the bars 91 and which have elastic prongs 93 serving to retain articles of laundry therebetween. The clamping elements 92 consist of corrosion-resistance metallic sheet material or the like and the articles of laundry are clamped between the pairs of cooperating prongs to be held in suspended position by the bias of the prongs which tend to move into actual abutment with each other.

Figure 13:
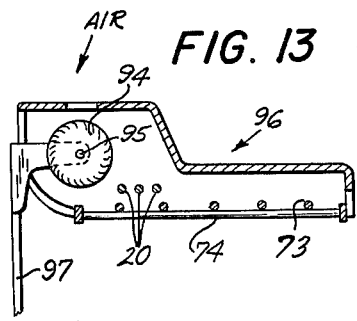
FIG. 13 is a vertical section through a drier wherein the blower is coaxial with the pivot means which secures the carrier to the main supporting structure.

FIG. 13 illustrates a portion of another drier which is constructed with a view to facilitate its manipulation by housewives, children and elderly persons with the exercise of minimal effort. The axis of the cylindrical blower 94 coincides with the axis of pivots 95 which secure the carrier 96 to the main supporting plate 97. The suspending device comprises a network of intersecting hanger bars 73, 74 of the type shown in FIG. 11, and the blower 94 directs a stream of air against a series of heat exchanger pipes 20. Since the blower 94 need not travel about the common horizontal axis of the pivots 95, the person in charge must lift only the carrier 96 and the bars 73, 74 when the carrier is pivoted upwardly to assume the position of FIG. 13. The motor (not shown) which drives the blower 94 is coaxial with this blower so that it remains stationary when the carrier 96 pivots about the common axis of the pins 95.

FIGS. 14 and 15 illustrate a further drier which is provided with means for distributing the stream of air into a series of smaller streamlets so that such streamlets reach all zones of the drying chamber 100 defined by a pan-shaped carrier 101 and a flexible curtain 102. In FIG. 14, the carrier is shown in two different positions including an inoperative position 101' in which it may be used as a room heater or fan, and an operative position (shown in phantom lines) in which it may be used as a means for drying articles 103 of laundry or the like. The curtain 102 comprises two flexible panels 102a, 102b which may be connected by a slide fastener 102c so as to form with the supporting wall 104 a tubular enclosure for the articles to be dried. Instead of using a slide fastener, the two flexible panels 102a, 102b may be connected by buttons or their vertical edges may be caused to overlap a few inches.

Figure 17:
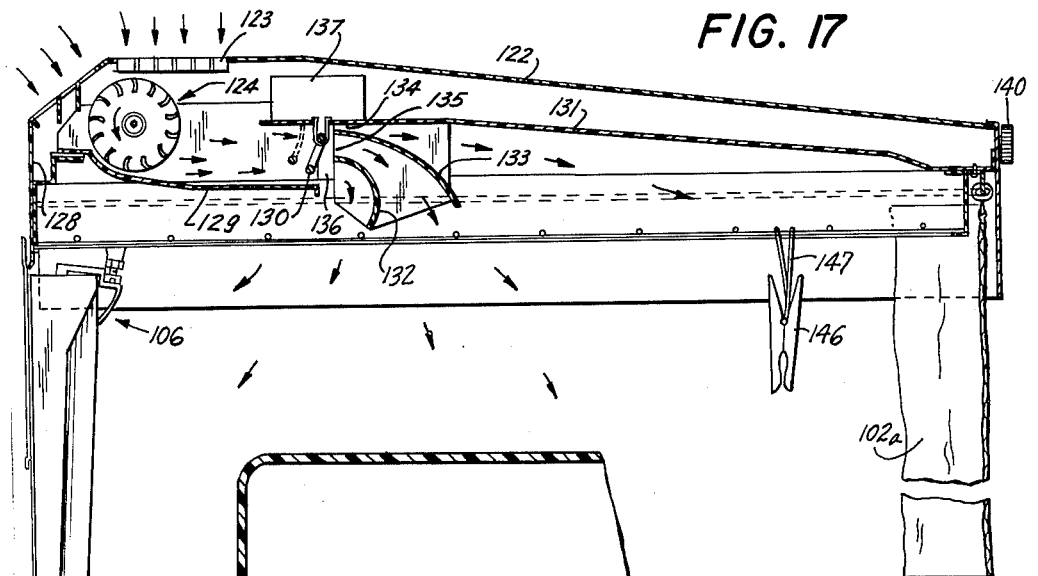
FIG. 17 is a longitudinal vertical section as seen in the direction of arrows from the line XVII—XVII of FIG. 16, showing the blower and the means for dividing the air stream into a series of smaller streamlets.
Figure 18:
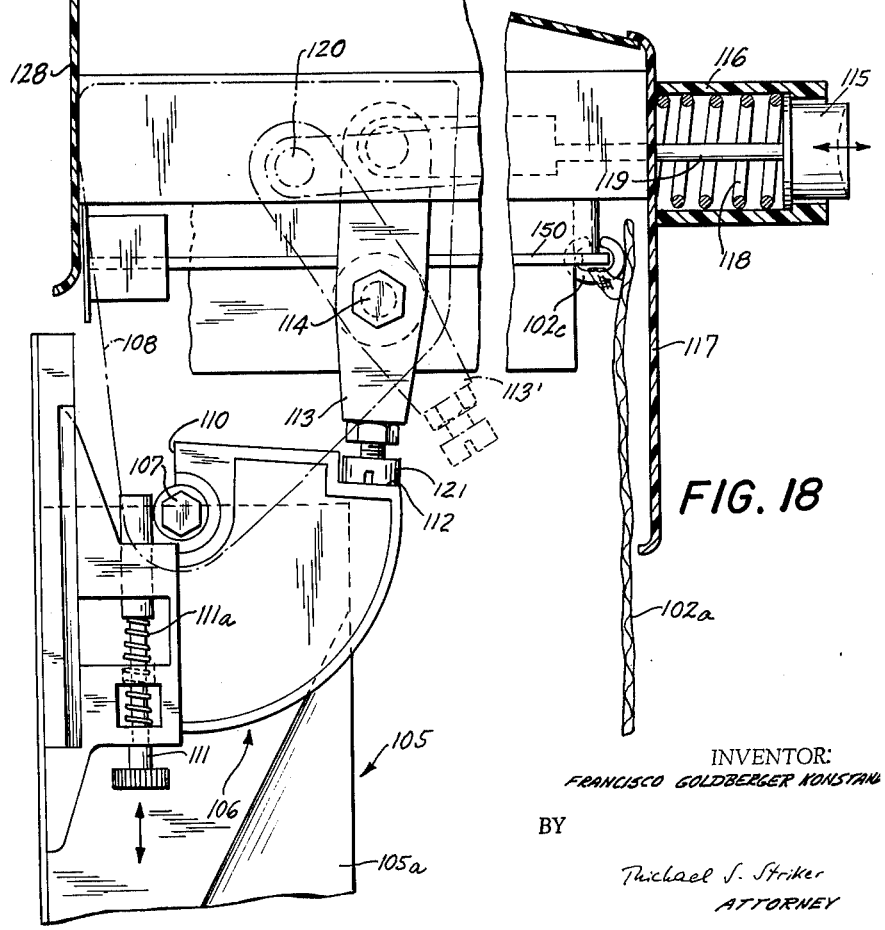
FIG. 18 is a fragmentary longitudinal vertical section as seen in the direction of arrows from the line XVIII—XVIII of FIG. 16, showing a portion of a locking mechanism which serves to hold the carrier in the operative position of FIG. 15.

The main supporting member of the drier assumes the form of an inverted U-shaped body 105 (see particularly FIG. 19) whose legs 105a, 105b are secured to the wall 104 by screws 105c and whose median portion 105d extends between the upper portions of the legs 105a, 105b and is also secured to the wall 104 by one or more screws 105c. The median portion 105d carries two spaced bearing brackets 106 for two detachable pivots 107 which extend through lugs 108 provided on the side walls 109 of the carrier 101 so that the carrier is pivotable about the common axis of the pivots 107. Each pivot 107 is held in a cutout 110 of the respective bracket 106 by a bolt 111 biased by a spring 111a so that the carrier may be detached from the supporting member 105 simply by moving the bolts 111 in downward direction as viewed in FIGS. 18 and 19. The bolts 111 are mounted in the brackets 106 and each of these brackets is formed with a recess 112 serving to receive one of two rockable locking levers 113 which are secured to the ends of a horizontal connecting shaft 114, this shaft being journalled in the side walls 109 of the carrier 101. A releasing knob 115 which is mounted in a handle 116 provided on the front wall 117 of the carrier 101 serves as a means for rotating the shaft 114 against the bias of a spring 118 so as to move the lower arms of the locking levers 113 away from the respective recesses 112, see the phantom-line position 113' in FIG. 18. The connection between the releasing knob 115 and the shaft 114 comprises a rod 119 which is articulately fixed to the upper arm of one of the levers 113 by a horizontal pin 120. It is to be noted that the levers 113 are rigidly secured to the shaft 114. The lower arms of these levers carry adjustable screws 121 whose heads come into actual engagement with the brackets 106 when the carrier 101 assumes the operative position of FIG. 15 or 17.

The top wall 122 of the carrier is provided with one or more louvered openings 123 which admit air drawn by an elongated roller or drum-shaped tangential blower 124 driven by an electric motor 125, see particularly FIG. 19. The front wall 117 of the carrier is formed with a cutout 127 which permits escape of air when the carrier assumes the inoperative position 101' of FIG. 14. The axial length of the blower 124 is slightly less than the distance between the side walls 109, and this blower is adjacent to the rear wall 128 of the carrier adjacent to the opening 123 and above a deflector plate 129 which directs the stream of air toward a series of heat exchanger pipes 130 suspended from a partition 131 which is accommodated in the internal space of the carrier below the top wall 122. The partition 131 forms part of a distributor arrangement which further includes arcuate baffles 132, 133 and which serves to divide the stream of heated air into a series of streamlets (see the arrows in FIG. 17) and to direct such streamlets into different zones of the chamber 100. Thus, one or more streamlets of heated air will flow through one or more passages 134 between the partition 131 and the baffle 133, one or more additional streamlets will flow through one or more passages 135 between the baffles 132, 133, and one or more further streamlets will flow through one or more passages 136 between the baffle 131 and plate 129. Additional baffles may be provided to divide the main stream of air which flows around the pipes 130 into additional streamlets. The pipes 130 are connected to a switch housing 137 which is also connected with a cable 138 serving to supply electric current which heats the resistor wires in the pipes 130 and which supplies current to the motor 125.

A clockwork mechanism 140 is mounted on the front wall 117 and is operatively connected with a switch in the circuit of the motor 125 so as to insure that the circuit of the motor remains completed for a desired period of time, e.g., one hour, 15 minutes or 30 minutes. This insures that the dried cannot waste heat energy when the nature and the quantity of laundry are such that all articles can be dried within a given period of time. Of course, the mechanism 140 (whose knob may be rotated with respect to a stationary marker 141 provided on the front wall 122) can be set in such a way that the motor 125 will continue to drive the blower reg 124 for any desired period of time; for example, the motor may be left running overnight to dry a predetermined quantity of laundry with circulating atmospheric air without any heating or to circulate the air in a laundry room wherein the articles of laundry are suspended on conventional drying racks externally of the chamber 100. The construction of such clockwork mechanisms is known in the art.

The suspending device of the dried shown in FIGS. 14 to 20 comprises a frame 143 which is fixed to the front, side and rear walls of the carrier 101 (see FIG. 16) and which supports a series of intersecting hanger bars 144, 145. These bars form a network which extends across the open side of the chamber defined by the walls of the carrier 105 and which may carry any desired number of clothes pins 146 each provided with a hook 147 enabling an operator to rapidly detach the hook from the respective bar or to detach the clothes pin from the respective hook. In this manner, the user may rearrange the pins 146 at her will so as to insure proper distribution of articles which are to be dried in the drying chamber 100. Adjacent to the rear wall 128, the frame 143 supports a series of flexible retaining straps 148 whose free end portions form hooks 149 adapted to engage the adjacent bar 144. The purpose of the straps 148 is to hold the panels 102a, 102b in collapsed condition when the carrier is pivoted to the position 101' of FIG. 14. The upper edge portions of the panels 102a, 102b are provided with coupling members in the form of eyelets 102c which are slidable along a U-shaped rail 150 secured to the underside of the top wall 122.

The side walls 109 conceal the brackets 106 and the entire supporting member 105 when the carrier is pivoted to the position 101' so that the dried assumes the form of a compact eye-pleasing structure which occupies very little space in a bathroom or a laundry room. By withdrawing the bolts 111 against the bias of the springs 111a, the user is in a position to move the carrier 101 into another room where it may be used as a room heater or fan.

The drier of my invention may be used as a hair drier, especially by ladies. Thus, as soon as a person is ready to dry his or her hair, the carrier 101 is moved to the position of FIG. 15 and the motor 125 is started to direct a stream of heated air into the chamber 100. This chamber is occupied by the preson whose hair requires drying and the closed curtain insures that the stream of hot air flows against the hair and thereupon along the body so as to insure that the person occupying the drying chamber 100 can stand extended drying without the danger of catching cold.

An important advantage of my drier is that the laundry is dried without any wear and tear. Thus, instead of revolving the laundry in a perforated drum in a manner known from conventional driers, the drier of my invention expels moisture while the articles of laundry remain in suspended condition and while the articles need not move at all. Even if the drier is constructed in a manner as described in connection with FIGS. 7 and 8, the wear on the laundry is nonexistent because any fluttering movement imparted thereto by the holder 26 or 42 cannot damage the articles since such articles need not come into actual contact with each other. When operating with hot air, the drier of my invention may be used for drying of all kinds of laundry made of cotton or the like which can withstand the temperature of hot air. When used as a cold drier, the apparatus of my invention may be used for drying of articles made of synthetic plastic material (nylon, Orlon, Perlon, Dralon, etc.), of wool, and any other substances which might be damaged if exposed to excessive heat. Furthermore, the drier may be used as an aerator for suits, costumes, dresses etc. Such articles of apparel are suspended from the hangers, bars or similar suspending means and are left in a stream of cold air for certain periods of time to expel all traces of odors such as the odor of moth balls, perspiration and others.

As a rule, the mechanism 140 will be adjustable in a number of ways so as to operate the motor 125 for a selected period of time up to 60 minutes by simultaneously completing the circuit of the pipes 130, to operate the motor 125 for any desired periods of time while the pipes 130 remain disconnected, to operate the motor 125 for any desired periods of time by simultaneously completing the circuit of the pipes 130, and/or to operate the motor for any desired periods of time while the pipes remain connected for a shorter period of time.

For example, the distance between the walls 117, 128 of the drier shown in FIGS. 14-20 may be about twenty-four inches, the distance between the side walls 109 may be about thirty inches, and the maximum height of the side walls 109 may be about seven inches. The length of the curtain 102 may be about forty inches and the carrier 101 is preferably mounted at such a level that its underside is sufficiently distant from the floor to enable a person of average height to stand beneath the bars 144, 145 in upright position when the carrier serves as a hair drier. The overall weight of the drier may be in the range of 15 kg. when the chamber 101 is dimensioned to accommodate 10–12 pounds of laundry at a time.

FIGS. 21 and 22 illustrate a collapsible drier wherein the pan-shaped carrier 160 is pivotable about the common axis of two horizontal pivots 161 (only one shown) which are adjacent to and parallel with the shaft 162 of a tangential blower 163. The carrier 160 is without a rear wall and may be pivoted between the horizontal position of FIG. 21 and the vertical position of FIG. 22. The fixed supporting means of the drier comprises a vertical plate 164 secured to a masonry wall 165 and having two spaced vertical extensions 166 (only one shown) which provide a space for and are outwardly adjacent to the side walls 167 of the carrier 160 when the latter assumes the vertical position of FIG. 22. The side walls 167 are hinged to the respective extensions 166 by the aforementioned pivots 161 and the shaft 162 is mounted in brackets 164a carried by the plate 164. The plate 164 carries a funnel-shaped air conveying intake member 169 which has an open top defining an elongated inlet for atmospheric air and an open side which faces away from the plate 164 and which defines an elongated outlet for escape of the air stream produced by the blower 163. A heating device including a series of elongated horizontal heat exchanger pipes 170 is mounted in the intake member 169 downstream of the blower 163 so that the air stream is heated in a fully automatic way prior to being permitted to escape through the outlet.

A suspending device 171 including a network of intersecting bars is mounted in the internal chamber of the carrier 160 close to the open underside thereof and serves to support clothes pins for articles of laundry, not shown. The carrier 160 also accommodates a rail 172 for a curtain 173.

The intake member 169 has a wall portion 168 which extends beneath the blower 163 and whose horizontal edge bounds the lower end of the outlet for heated air.

The top wall 174 of the carrier 160 engages a second wall portion 168a of the intake member 169 just above the outlet for hot air so that the air is prevented from leaking between the parts 174, 168a when the carrier 160 assumes the position of FIG. 21 whereby the air stream is compelled to enter the chamber of the carrier and to escape downwardly so as to dry the articles of laundry which might be suspended on the bars of the suspending device 171. However, when the carrier 160 is pivoted to the position of FIG. 22, the top wall 174 exposes the outlet of the intake member 169 and the upper edge of this wall then abuts against the wall portion 168 so that the stream of heated or unheated air is free to escape into the atmosphere without passing through the internal chamber of the carrier. The drier then serves as a room heater or room ventilator depending upon whether or not the pipes 170 are connected to a source of electrical energy. In FIG. 22, the stream of air discharged through the outlet of the intake member 169 is free to flow in a horizontal direction and away from the supporting plate 164.

The horizontal edge of the top wall 174 is provided with a strip 175 of sealing material which may abut against the wall portion 168 or 168a depending on the momentary position of the carrier 160. Th top wall 174 carries at its outer side a manually operable valve in the form of a reciprocable flap 176 which may be shifted upwardly or downwardly so as to regulate the escape of heated or unheated air through the outlet of the intake member 169. It is equally possible to mount the flap 176 or a similar valve member directly on the upper wall portion 168a of the intake member 169 or on one of the extensions 166.

FIGS. 23 and 24 illustrate a similar drier whose carrier 180 is again without a rear wall so that the outlet of the fixed intake member 181 may direct a stream of heated air in downward direction (see FIG. 24) when the carrier 180 is adjacent to the wall 165. In order to make sure that the suspending device 182 may extend close to the wall 165, the drier of FIGS. 23 and 24 is constructed in such a way that the innermost portion 182a of the device 182 may move to a level close to the inlet of the intake member 181 whenever the carrier 180 pivots to the position of FIG. 24. This is achieved by moving the pivot axis of the carrier 180 away from the supporting plate 164 so as to provide a space for the portion 182a of the suspending device 182 which then extends between the plate 164 and the common axis of the pivots 161.

Otherwise, the construction of the drier is the same as that of the drier shown in FIGS. 21 and 22. The axis of the blower 185 is parallel with the common axis of the pivots 161. The heat exchanger pipes 170 are mounted in the intake member 181 but it is equally possible to provide additional pipes in the chamber of the carrier 180 if desired. Also, the pipes 170 may be omitted so that the air stream is heated only when the carrier 180 assumes the position of FIG. 23. In such driers, heat exchanger pipes must be mounted solely in the carrier so that a so-constructed drier merely serves as a room ventilator if and when the carrier is pivoted to the position of FIG. 24.

The means for pivoting the carriers 160, 180 and for locking them in the position of FIGS. 21 and 23 were omitted for the sake of clarity. Such locking and pivoting means may be constructed in a manner as disclosed in connection with FIGS. 14 to 20.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A drier for articles of laundry and the like, comprising fixed supporting means; a carrier having a top wall, a pair of spaced side walls, a rear wall adjacent to said supporting means, and a front wall, said walls defining between themselves a substantially flat chamber having an open side located opposite said top wall and said carrier having a pair of openings one of which is located in the proximity of said rear wall and the other of which is located in the proximity of said front wall; pivot means connecting said carrier to said supporting means so that the carrier is pivotable downwardly and upwardly about a horizontal axis which is adjacent to said rear wall to respectively assume a first position in which the open side of said chamber is located in a substantially vertical plane and an operative position in which the open side of said chamber faces downwardly; a blower accommodated in said chamber and arranged to draw a stream of air through said one opening so that the stream of air flows into and is discharged through the open side of said chamber when the carrier assumes said operative position; and suspending means permanently mounted in said chamber in said carrier extending from substantially the region of said rear wall to substantially the region of said front wall and slightly spaced from said blower and arranged to support articles of laundry in the stream of air passing through the open side of said carrier, said blower directing a stream of air through said other opening when the carrier assumes said first position and the escape of air through the open side of said chamber is blocked by a masonry wall or the like.

2. A drier as set forth in claim 1, wherein said one opening is provided in said rear wall and wherein said other opening is a cutout provided in said front wall.

3. A drier for articles of laundry and the like, according to claim 1, comprising means for moving said suspending means with respect to said carrier so that articles of laundry will flutter in the stream of air.

4. A drier as set forth in claim 3, wherein said suspending means comprises a holder and a plurality of hanger means supported by said holder, and wherein the means for moving said suspending means comprises a motor and means driven by said motor and operatively connected with said holder to reciprocate the holder with respect to said carrier.

5. A drier for articles of laundry and the like, according to claim 1, wherein said suspending means comprise a perforated plate extending across the open side of said chamber and clothes pins suspended from said plate.

6. A drier for articles of laundry and the like, according to claim 1, wherein said suspending means comprise a plurality of cooperating clamping elements of resilient material arranged to clamp articles of laundry therebetween.

7. A drier for articles of laundry and the like, according to claim 1, wherein said suspending means comprise a plurality of bars parallel with said side walls and a hanger rigid with and parallel to each of said hanger bars.

8. A drier for articles of laundry and the like, according to claim 1, wherein said suspending means comprise a plurality of spaced bars extending across the open side of said chamber and each having a channel facing away from the top wall of said carrier, and a hanger for each of said bars, each of said hangers having a plurality of sections pivotally secured to the respective bar so as to be movable into and out of the respective channel.

9. A collapsible drier for articles of laundry and the like according to claim 1, wherein at least one of said walls has an air admitting opening; and wherein said fan is disposed between said opening and said open side and is arranged to produce a stream of air which enters through said opening and is discharged through the open side of said chamber.

10. A drier as set forth in claim 9, further comprising baffle means arranged to divide the stream of air produced by said blower so that the air is discharged substantially uniformly through all zones of said open side when the carrier is moved to said operative position.

11. A drier as set forth in claim 9, further comprising electric heater means disposed in the path of the air stream between said blower and the open side of said chamber so that the air is heated prior to its discharge from the chamber.

12. A drier for articles of laundry and the like, comprising fixed supporting means; a carrier having a top wall and a pair of spaced side walls, said walls defining between themselves a substantially flat chamber with an open side located opposite said top wall; pivot means connecting said carrier to said supporting means so that the carrier is pivotable downwardly and upwardly about a horizontal axis to respectively assume a first position in which the open side of said chamber is located in a substantially vertical plane and an operative position in which the open side of said chamber faces downwardly; a blower accommodated in said chamber and arranged to produce a stream of air which flows into and thereupon from said chamber; and suspending means permanently mounted in said carrier substantially parallel to said open side of said carrier and slightly spaced from said blower and arranged to support articles of laundry in the stream of air when the carrier is moved to said operative position, said suspending means comprising a network of intersecting bars extending across the open side of said chamber, and clothes pins suspended on said bars.

13. A drier for articles of laundry and the like, comprising fixed supporting means; a carrier having a top wall, a pair of spaced side walls, a rear wall adjacent to said supporting means, and a front wall, said walls defining between themselves a substantially flat chamber having an open side located opposite said top wall; pivot means connecting said carrier to said supporting means so that the carrier is pivotable downwardly and upwardly about a horizontal axis which is adjacent to said rear wall to respectively assume a first position in which the open side of said chamber is located in a substantially vertical plane and an operative position in which the open side of said chamber faces downwardly; a tangential blower mounted in said chamber and having an axis of rotation located in the region and extending in direction of said first mentioned axis; motor means provided in said chamber and operatively connected with said blower so as to drive the same at the will of the operator whereby the blower produces a stream of air which flows into and thereupon through the open side of said chamber when the carrier assumes said operative position; a heater device comprising at least one heat exchanging member located in the air stream between said blower and the open side of said chamber so that the stream is heated prior to escaping through said open side; and suspending means permanently mounted in said carrier substantially parallel to said open side of said carrier and slightly spaced from said blower and arranged to support articles of laundry in the steam of heated air when the carrier assumes said operative position.

14. A drier for articles of laundry and the like, according to claim 13, wherein the axis of rotation of said tangential blower coincides with said first mentioned axis.

15. A drier for articles of laundry and the like, according to claim 13, wherein said blower comprises a plurality of coaxially arranged drum-shaped sections.

16. A drier for articles of laundry and the like, comprising fixed supporting means; a carrier having a top wall, a pair of spaced side walls, a rear wall adjacent to said supporting means, and a front wall, said walls defining between themselves a chamber having an open side located opposite said top wall; pivot means connecting said carrier to said supporting means so that the carrier is pivotable downwardly and upwardly about a horizontal axis which is adjacent to said rear wall to respectively assume a first position in which the open side of said chamber is located in a substantially vertical plane and an operative position in which the open side of said chamber faces downwardly; a tangential blower mounted in said chamber and having an axis of rotation located close to and parallel with said first mentioned axis; motor means provided in said chamber and operatively connected with said blower so as to drive the same at the will of the operator whereby the blower produces a stream of air which flows into and thereupon through the open side of said chamber when the carrier assumes said operative position, the axial length of said blower approximating the distance between said side walls; a heater device comprising at least one heat exchanging member located in the air stream between said blower and the open side of said chamber so that the stream is heated prior to escaping through said open side; and suspending means permanently mounted in said carrier substantially parallel to said open side of said carrier and slightly spaced from said blower and arranged to support articles of laundry in the stream of heated air when the carrier assumes said operative position.

17. A drier for articles of laundry and the like, comprising fixed supporting means; a carrier having a top wall, a pair of spaced side walls, a rear wall adjacent to said supporting means, and a front wall, said walls defining between themselves a chamber having an open side located opposite said top wall; pivot means connecting said carrier to said supporting means so that the carrier is pivotable downwardly and upwardly about a horizontal axis which is adjacent to said rear wall to respectively assume a first position in which the open side of said chamber is located in a substantially vertical plane and an operative position in which the open side of said chamber faces downwardly; a blower mounted in said chamber and having an axis of rotation located close to and parallel with said first mentioned axis; motor means provided in said chamber and operatively connected with said blower so as to drive the same at the will of the operator whereby the blower produces a stream of air which flows into and thereupon through the open side of said chamber when the carrier assumes said operative position; a heater device comprising at least one heat exchanging member located in the air stream between said blower and the open side of said chamber so that the stream is heated prior to escaping through said open side; distributor means disposed between said heat exchanging member and said open side to divide the stream of heated air into a plurality of streamlets which flow to different zones of said chamber; and suspending means permanently mounted in said carrier substantially parallel to said open side of said carrier and slightly spaced from said blower and arranged to support articles of laundry in the stream of heated air when the carrier assumes said operative position.

18. A drier for articles of laundry and the like, comprising fixed supporting means; a carrier having a top wall, a pair of spaced side walls, a rear wall adjacent to said supporting means, and a front wall, said walls defining between themselves a chamber having an open side located opposite said top wall; pivot means connecting said carrier to said supporting means so that the carrier is pivotable downwardly and upwardly about a horizontal axis which is adjacent to said rear wall to respectively assume a first position in which the open side of said chamber is located in a substantially vertical plane and an operative position in which the open side of said chamber faces downwardly; a blower mounted in said chamber and having an axis of rotation located close to and parallel with said first mentioned axis; motor means provided in said chamber and operatively connected with said blower so as to drive the same at the will of the operator whereby the blower produces a stream of air which flows into and thereupon through the open side of said chamber when the carrier assumes said operative position; a heater device comprising at least one heat exchanging member located in the air stream between said blower and the open side of said chamber so that the stream is heated prior to escaping through said open side; suspending means permanently mounted in said carrier extending substantially parallel to said open side thereof and arranged to support articles of laundry in the stream of heated air when the carrier assumes said operative position; and a curtain comprising flexible panels secured to said carrier and extending downwardly from said side walls and from said front wall when the carrier assumes said operative position.

19. A drier as set forth in claim 18, wherein said curtain comprises a panel which extends downwardly from said rear wall so that said curtain forms a tubular enclosure whose upper end is adjacent to the open side of said chamber.

20. A drier as set forth in claim 18, wherein said curtain comprises a slide fastener arranged to connect two of said panels.

21. A drier as set forth in claim 18, further comprising a rail secured to said carrier and surrounding at least a portion of said open side, and coupling members secured to said panels and slidable along said rail.

22. A drier as set forth in claim 18, wherein said panels are collapsible so as to be accommodated in said chamber and further comprising retaining means for holding the collapsed panels in said chamber.

23. A drier as set forth in claim 22, wherein said suspending means comprises a plurality of bars extending across the open side of said chamber and wherein said retaining means comprises a plurality of straps fixed to said carrier and having portions arranged to engage one of said bars.

24. A drier for articles of laundry and the like, comprising fixed supporting means; a carrier having a top wall, a pair of spaced side walls, a rear wall adjacent to said supporting means, and a front wall, said walls defining between themselves a chamber having an open side located opposite said top wall; pivot means connecting said carrier to said supporting means so that the carrier is pivotable downwardly and upwardly about a horizontal axis which is adjacent to said rear wall to respectively assume a first postion in which the open side of said chamber is located in a substantially vertical plane and an operative position in which the open side of said chamber faces downwardly; a blower mounted in said chamber and having an axis of rotation located close to and parallel with said first mentioned axis; motor means provided in said chamber and operatively connected with said blower so as to drive the same at the will of the operator whereby the blower produces a stream of air which flows into and thereupon through the open side of said chamber when the carrier assumes said operative position; a heater device comprising at least one heat exchanging member located in the air stream between said blower and the open side of said chamber so that the stream is heated prior to escaping through said open side; suspending means permanently mounted in said carrier extending substantially parallel to said open side thereof and arranged to support articles of laundry in the stream of heated air when the carrier assumes said operative position; and a locking device arranged to hold the carrier in said operative position.

25. A drier as set forth in claim 24, wherein said locking device comprises a bracket rigid with said supporting means and having a recess therein, a lever rockably secured to one of said side walls and having an arm extending into said recess to prevent movement of the carrier to said inoperative position, and manually operable releasing means arranged to rock said lever at the will of the operator so as to remove said arm from said recess.

26. A drier as set forth in claim 25, wherein said locking device comprises a second bracket spaced from said first bracket and secured to said supporting means, each of said brackets having a cutout and said pivot means comprising a pair of coaxial pivots each received in one of said cutouts so that the carrier may be separated from said brackets.

27. A drier for articles of laundry and the like, comprising fixed supporting means; a carrier having a top wall, a pair of spaced side walls, a rear wall adjacent to said supporting means, and a front wall, said walls defining between themselves a chamber having an open side located opposite said top wall; pivot means connecting said carrier to said supporting means so that the carrier is pivotable downwardly and upwardly about a horizontal axis which is adjacent to said rear wall to respectively assume a first position in which the open side of said chamber is located in a substantially vertical plane and an operative position in which the open side of said chamber faces downwardly; a blower mounted in said chamber and having an axis of rotation located close to and parallel with said first mentioned axis; electric motor means provided in said chamber and operatively connected with said blower so as to drive the same at the will of the operator whereby the blower produces a stream of air which flows into and thereupon through the open side of said chamber when the carrier assumes said operative position; a clockwork mechanism connected in the circuit of said motor means and operable by hand to complete the circuit of said motor means for predetermined periods of time; a heater device comprising at least one heat exchanging member located in the air stream between said blower and the open side of said chamber so that the stream is heated prior to escaping through said open side; and suspending means permanently mounted in said carrier in the region of said open side thereof and arranged to support articles of laundry in the stream of heated air when the carrier assumes said operative position.

28. A collapsible drier for articles of laundry and the like, comprising fixed supporting means; a carrier having a top wall, a rear wall adjacent to said supporting means, and a pair of spaced side walls, said walls defining between themselves a chamber with an open side located opposite said top wall; pivot means connecting said carrier to said supporting means so that the carrier is pivotable about a horizontal axis in downward direction to assume a first position in which the open side of said chamber is located in a substantially vertical plane and upwardly to assume an operative position in which the open side of said chamber faces downwardly; horizontally extending elongated blower means disposed between said side walls and arranged to produce a stream of air which flows into and thereupon from said chamber; and article suspending means permanently mounted in said chamber in said carrier extending from substantially the region of said rear wall to substantially the region of said front wall and slightly spaced from said blower means and arranged to support articles to be dried in suspended condition in the stream of air when the carrier is moved to said operative position.

29. A collapsible drier for articles of laundry and the like, comprising fixed supporting means; a substantially flat carrier having a top wall, a rear wall adjacent to said supporting means, and a pair of spaced side walls, said walls defining between themselves a chamber with an open side located opposite said top wall; pivot means connecting said carrier to said supporting means so that the carrier is pivotable about a horizontal axis in downward direction to assume a first position in which the open side of said chamber is located in a substantially vertical plane and upwardly to assume an operative position in which the open side of said chamber faces downwardly, an elongated blower disposed between said side walls and arranged to produce a stream of air which flows into and thereupon from said chamber, said blower being adjacent to and parallel with said horizontal axis; and article suspending means permanently mounted in said chamber and arranged in the region of said open side thereof so as to support articles to be dried in suspended condition in the stream of air when the carrier is moved to said operative position.

30. A collapsible drier for articles of laundry and the like, comprising fixed supporting means; a substantially flat carrier having a top wall, a rear wall adjacent to said supporting means, and a pair of spaced side walls, said walls defining between themselves a chamber with an open side located opposite said top wall; pivot means connecting said carrier to said supporting means so that the carrier is pivotable about a horizontal axis in downward direction to assume a first position in which the open side of said chamber is located in a substantially vertical plane and upwardly to assume an operative position in which the open side of said chamber faces downwardly; a blower comprising an elongated drum coaxial with said pivot means and having a length not substantially less than the distance between said side walls, said drum being arranged to produce a stream of air which flows into and thereupon downwardly and through the open side of said chamber when the carrier assumes said operative position; and article suspending means permanently mounted in said chamber in said carrier extending from substantially the region of said rear wall to substantially the region of said front wall and slightly spaced from said blower and arranged to support articles to be dried in suspended condition in the stream of air when the carrier is moved to said operative position.

31. A combination drier for articles of laundry and room ventilator, comprising fixed supporting means; a carrier having a top wall, a rear wall adjacent to said supporting means, a pair of spaced side walls, and a front wall, said walls defining between themselves a chamber having an open side located opposite said top wall and said front and rear walls each having an opening communicating with said chamber; pivot means connecting said carrier to said supporting means so that the carrier is pivotable about a horizontal axis in downward direction to assume a first position in which the open side of said chamber is located in a substantially vertical plane and is adjacent to the surface of a wall member which carries said supporting means and in which said front wall is located at a level below said rear wall, and upwardly to an operative position in which said open side faces downwardly; an elongated tangential blower provided in said chamber and extending transversely between said side walls to produce a stream of air entering through the opening of said rear wall and escaping through said open side when the carrier assumes said operative position, the air stream escaping through the opening of said front wall when the carrier assumes said first position; and suspending means permanently mounted in said chamber in the region of and extending parallel to said open side thereof and arranged to support articles in suspended condition when the carrier assumes said operative position.

References Cited by the Examiner
UNITED STATES PATENTS

| 1,602,315 | 10/1926 | Wood | 34—233 |
| 1,825,310 | 9/1931 | Engstrom | 34—239 |
| 2,071,296 | 2/1937 | Connor et al. | 34—163 |
| 2,470,646 | 5/1949 | Richardson | 34—239 |
| 2,571,918 | 10/1951 | Meninger | 34—239 |
| 2,668,368 | 2/1954 | Jacobs | 34—239 |
| 2,705,377 | 4/1955 | Konstandt | 34—163 |
| 2,850,810 | 9/1958 | Lyons et al. | 34—163 |
| 2,919,497 | 1/1960 | Konstandt | 34—151 |
| 3,054,194 | 9/1962 | Hayes | 34—163 |
| 3,152,876 | 10/1964 | Laing | 34—151 |

FOREIGN PATENTS 843,090   8/1960   Great Britain.

WILLIAM F. O'DEA, *Primary Examiner.*
NORMAN YUDKOFF, *Examiner.*
F. E. DRUMMOND, D. A. TAMBURRO,
*Assistant Examiners.*